(12) United States Patent
Kudo et al.

(10) Patent No.: US 12,019,422 B2
(45) Date of Patent: Jun. 25, 2024

(54) CONTROL DEVICE WITH ATTRIBUTE SETTING FOR INDUSTRIAL MACHINE, ATTRIBUTE SETTING SYSTEM FOR CONTROL DEVICE FOR INDUSTRIAL MACHINE, METHOD OF SETTING CONTROL DEVICE WITH ATTRIBUTES FOR INDUSTRIAL MACHINE, AND INFORMATION STORAGE MEDIUM FOR SETTING A CONTROL DEVICE WITH ATTRIBUTES

(71) Applicant: Kabushiki Kaisha Yaskawa Denki, Kitakyushu (JP)

(72) Inventors: Masaomi Kudo, Kitakyushu (JP); Takefumi Matsunaga, Kitakyushu (JP); Hiroyuki Ishibashi, Kitakyushu (JP); Yuki Yoshida, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 7 days.

(21) Appl. No.: 17/082,021

(22) Filed: Oct. 28, 2020

(65) Prior Publication Data

US 2021/0132564 A1    May 6, 2021

(30) Foreign Application Priority Data

Oct. 30, 2019  (JP) ................. 2019-197400

(51) Int. Cl.
*G05B 19/042* (2006.01)
*G05B 19/05* (2006.01)
(Continued)

(52) U.S. Cl.
CPC ....... *G05B 19/0426* (2013.01); *G05B 19/056* (2013.01); *G05B 19/058* (2013.01);
(Continued)

(58) Field of Classification Search
CPC ................. G06F 12/1009; G06F 12/109
See application file for complete search history.

(56) References Cited

U.S. PATENT DOCUMENTS 5,452,430 A * 9/1995 Dievendorff ........ G06F 11/1441
711/170
2005/0201177 A1   9/2005 Shiraishi et al.
(Continued)

FOREIGN PATENT DOCUMENTS

CN    1677571 A    10/2005
CN    104951249 A   9/2015
(Continued)

OTHER PUBLICATIONS

Nandgrave et al., Industrial Drives & Automation using PLC, 2014, International Journal of Engineering Research and Technology (IJERT), vol. 3:Issue 2, pp. 2228-2233 (Year: 2014).*
(Continued)

*Primary Examiner* — Gary W. Cygiel
(74) *Attorney, Agent, or Firm* — HEA Law PLLC

(57) ABSTRACT

A control device configured to control an industrial machine, the control device having: a plurality of memories including a first memory configured to hold data when a power supply is off and a second memory configured to inhibit data from being held when the power supply is off; and circuitry configured to: set, in each of a plurality of data units, an attribute indicating whether the data unit is to be held when the power supply is off; and set an address of each data unit such that each data unit is stored in one of the plurality of memories corresponding to the attribute.

20 Claims, 8 Drawing Sheets

| DATA UNIT | ATTRIBUTE | CONVERSION TABLE | |
|---|---|---|---|
| | | VIRTUAL ADDRESS | PHYSICAL ADDRESS |
| MW00000-MW01999 | DO-NOT-HOLD ATTRIBUTE | 0000 | 700000 |
| MW02000-MW03999 | HOLD ATTRIBUTE | 2000 | 0000 |
| MW04000-MW05999 | DO-NOT-HOLD ATTRIBUTE | 4000 | 702000 |
| MW06000-MW07999 | HOLD ATTRIBUTE | 6000 | 2000 |
| MW08000-MW09999 | HOLD ATTRIBUTE | 8000 | 4000 |
| ⋮ | ⋮ | ⋮ | ⋮ |

(51) Int. Cl.
  *G06F 3/06* (2006.01)
  *G06F 12/02* (2006.01)
  *G06F 12/1009* (2016.01)
  *G06F 12/109* (2016.01)

(52) U.S. Cl.
  CPC ............ *G06F 3/06* (2013.01); *G06F 12/0284* (2013.01); *G06F 12/1009* (2013.01); *G06F 12/109* (2013.01); *G05B 2219/25004* (2013.01)

(56) References Cited

U.S. PATENT DOCUMENTS

| | | | |
|---|---|---|---|
| 2011/0213866 A1* | 9/2011 | Yoshimura | H04L 41/0853 709/223 |
| 2012/0079174 A1* | 3/2012 | Nellans | G06F 13/1694 711/E12.008 |
| 2013/0024600 A1* | 1/2013 | Wakrat | G06F 12/08 711/E12.008 |
| 2013/0332662 A1 | 12/2013 | Katori et al. | |
| 2015/0278088 A1 | 10/2015 | Ito | |
| 2017/0322740 A1 | 11/2017 | Gabryjelski | |
| 2018/0150322 A1 | 5/2018 | Dunham et al. | |
| 2018/0210414 A1 | 7/2018 | Ino | |
| 2021/0081324 A1* | 3/2021 | Bradshaw | G06F 12/1009 |

FOREIGN PATENT DOCUMENTS

| | | |
|---|---|---|
| CN | 109074311 A | 12/2018 |
| CN | 109997112 A | 7/2019 |
| EP | 2549385 A1 | 1/2013 |
| JP | 2002014705 A | 1/2002 |
| JP | 2006243780 A | 9/2006 |
| JP | 2012194678 A | 10/2012 |
| JP | 2014099066 A | 5/2014 |
| JP | 2016031554 A | 3/2016 |
| JP | 2016143367 A | 8/2016 |
| JP | 2017021498 A | 1/2017 |
| JP | 2018120416 A | 8/2018 |

OTHER PUBLICATIONS

Search Report of Mar. 4, 2021, for corresponding EP Patent Application No. 20203985.5 pp. 1-9.
Office Action of Dec. 8, 2020, for corresponding JP Patent Application No. 2019-197400 with partial English translation pp. 1-4.
Office Action of Mar. 24, 2020, for corresponding JP application No. 2019-197400 with Partial English translation.
Office Action of Aug. 4, 2020, for corresponding JP application No. 2019-197400 with Partial English translation.
Office Action of Oct. 27, 2023, for corresponding CN Patent Application No. 202011177635.0 with its English translation, pp. 1-16.

* cited by examiner

FIG.5

| DATA UNIT | ATTRIBUTE | CONVERSION TABLE ||
| --- | --- | --- | --- |
| | | VIRTUAL ADDRESS | PHYSICAL ADDRESS |
| MW00000-MW01999 | DO-NOT-HOLD ATTRIBUTE | 0000 | 700000 |
| MW02000-MW03999 | HOLD ATTRIBUTE | 2000 | 0000 |
| MW04000-MW05999 | DO-NOT-HOLD ATTRIBUTE | 4000 | 702000 |
| MW06000-MW07999 | HOLD ATTRIBUTE | 6000 | 2000 |
| MW08000-MW09999 | HOLD ATTRIBUTE | 8000 | 4000 |
| ... | ... | ... | ... |

CONTROL DEVICE WITH ATTRIBUTE SETTING FOR INDUSTRIAL MACHINE, ATTRIBUTE SETTING SYSTEM FOR CONTROL DEVICE FOR INDUSTRIAL MACHINE, METHOD OF SETTING CONTROL DEVICE WITH ATTRIBUTES FOR INDUSTRIAL MACHINE, AND INFORMATION STORAGE MEDIUM FOR SETTING A CONTROL DEVICE WITH ATTRIBUTES

CROSS-REFERENCE TO RELATED APPLICATION

The present disclosure contains subject matter related to that disclosed in Japanese Patent Application JP2019-197400 filed in the Japan Patent Office on Oct. 30, 2019, the entire contents of which are hereby incorporated by reference.

BACKGROUND OF THE INVENTION

1. Field of the Invention

The embodiments disclosed herein relate to a control device for an industrial machine, a setting system for a control device for an industrial machine, a method of setting a control device for an industrial machine, and an information storage medium.

2. Description of the Related Art

In JP 2012-194678 A, there is described a technology for creating a control program fora programmable logic controller (PLC) by using a ladder chart, for example. In this technology, programming is performed by using data held when a power supply is off and data not held when the power supply is off in manners different from each other.

SUMMARY OF THE INVENTION

According to one aspect of the present invention, there is provided a control device configured to control an industrial machine, the control device having: a plurality of memories including a first memory configured to hold data when a power supply is off and a second memory configured to inhibit data from being held when the power supply is off; and circuitry configured to: set, in each of a plurality of data units, an attribute indicating whether the data unit is to be held when the power supply is off; and set an address of each data unit such that each data unit is stored in one of the plurality of memories corresponding to the attribute.

BRIEF DESCRIPTION OF THE DRAWINGS

FIG. 5 is a table for showing a data storage example of attribute setting data.

DESCRIPTION OF THE EMBODIMENTS

1. Overall Configuration of Embodiment

From the perspective of the inventors of the present invention, in a control device, for example, a PLC configured to control an industrial machine, programming is performed by using data held when a power supply is off and data not held when the power supply is off in manners different from each other, and a program is required to be modified when an attribute of the data is changed. As a result of extensive research and development for eliminating time and effort involved in modifying the program, the inventors of the present invention have conceived of a novel and original control device for an industrial machine and the like. A detailed description is now given of the control device for an industrial machine and the like according to an embodiment of the present invention.

Figure 1:
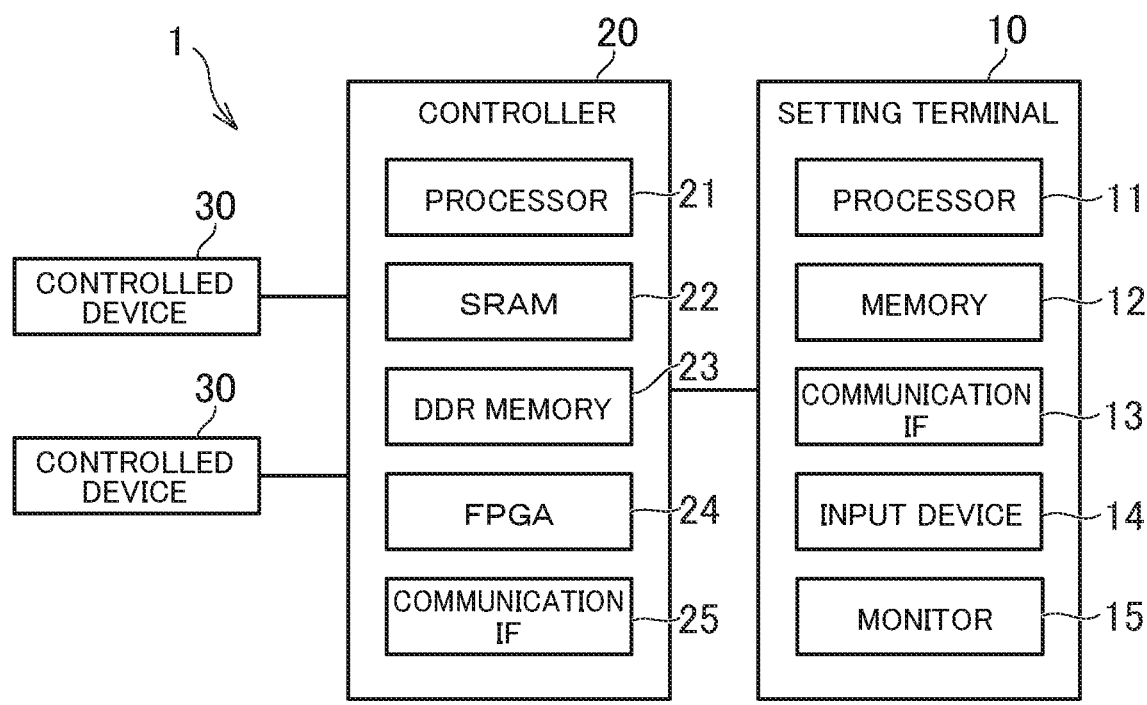
FIG. 1 is a diagram for illustrating an example of an overall configuration of a control device for an industrial machine and a setting system for the control device for an industrial machine.

FIG. 1 is a diagram for illustrating an example of an overall configuration of a control device for an industrial machine and a setting system for the control device for an industrial machine. As illustrated in FIG. 1, a setting system 1 includes a setting terminal 10, a controller 20, and a controlled device 30. In this embodiment, the setting terminal 10, the controller 20, and the controlled device 30 each are connectable to any network conforming to, for example, Ethernet (trademark) or a dedicated communication standard. The setting system 1 is an example of a setting system fora control device for an industrial machine, and is simply referred to as "setting system 1" in this embodiment.

The setting terminal 10 is a computer to be operated by a user. For example, the setting terminal 10 is a personal computer, a mobile terminal (including a tablet terminal), or a cellular phone (including a smartphone). The setting terminal 10 includes a processor 11, a memory 12, a communication interface (IF) 13, an input device 14, and a monitor 15.

The processor 11 is a general-purpose processor, for example, a central processing unit (CPU). The setting terminal 10 includes at least one processor 11. The processor 11 may include a publicly known memory management unit. The memory 12 includes a random-access memory (RAM) and a hard disk drive, and is configured to store various programs and data. The processor 11 is configured to execute various types of processing based on those programs and data. The communication IF 13 is an interface for wired or wireless communication, and includes, for example, a network card and various communication connectors. The input device 14 is an operation member such as a mouse and a keyboard. The monitor 15 is a liquid crystal display, an organic EL display, or the like, and is configured to display various types of screens in accordance with instructions from the processor 11.

The controller 20 is a so-called PLC, and is configured to control at least one controlled device 30. The controller 20 is an example of the control device for an industrial machine. Therefore, the term "controller 20" as used in this embodiment can be read as "control device for an industrial machine." The control device for an industrial machine is not limited to the controller 20, and any type of device can be applied. For example, the control device for an industrial machine may be a robot controller, a robot controller sub-device, a motor controller, a motor controller sub-device, an inverter, a machine tool, or the like.

The controller 20 includes a processor 21, a static random access memory (SRAM) 22, a double data rate (DDR) memory 23, a field-programmable gate array (FPGA) 24, and a communication IF 25. The physical configurations of the processor 21 and the communication IF 25 may be the same as those of the processor 11 and the communication IF 13, respectively. Other components of the controller 20, such as a power supply and a battery, are not shown.

The SRAM 22 is an example of a first memory. Therefore, the term "SRAM 22" as used in this embodiment can be read as "first memory." The first memory is a memory configured to hold data when the power supply of the controller 20 is off.

As used herein, "the power supply is off" refers to a state in which the power supply of the controller 20 has been turned off. For example, the power supply is considered to be off when a power supply button of the controller 20 is switched off or when a predetermined shutdown operation from the controller 20 is performed. Further, "the power supply is off" may refer to a state in which all the components in the controller 20 are not completely energized, but in this embodiment, "the power supply is off" refers to a state in which the main components of the controller 20 (for example, the processor 21) are not energized, and at least the SRAM 22 is energized. Energization at the time when the power supply is off is performed by external power or by a battery built in the controller 20.

As used herein, "hold data" refers to not erasing the data. In other words, holding data means maintaining a state in which the data is recorded. The first memory is configured to hold data when the power supply of the controller 20 is on, and even when the power supply is turned off, the first memory continues to hold the data (the values immediately before the power supply is turned off) that the first memory has been holding.

For example, the first memory is a non-volatile memory or a memory supporting battery backup. A non-volatile memory is a memory configured to hold data even when not energized. A memory supporting battery backup is a memory configured to hold data by being energized when the power supply of the computer is off. Battery backup is sometimes also referred to as "memory backup." Battery backup enables a memory originally classified as being a volatile memory to hold data when the power supply is off. The first memory is not limited to the SRAM 22, and any type of memory can be applied. For example, the first memory may be a magnetoresistive random access memory (MRAM), a non-volatile RAM (NVRAM), an EEPROM, or a flash memory.

The DDR memory 23 is an example of a second memory. Therefore, the term "DDR memory 23" as used in this embodiment can be read as "second memory." The second memory is a memory configured inhibit data from being held when the power supply of the controller 20 is off. The second memory is configured to hold data when the power supply of the controller 20 is on, and when the power supply is turned off, erases (that is, does not hold) the data (the values immediately before the power supply is turned off) that the second memory has been holding.

For example, the second memory is a volatile memory or a memory without supporting battery backup. A volatile memory is a memory in which data is not held unless the memory is energized. A memory without supporting battery backup is a memory that does not have a battery backup function. The second memory is not limited to the DDR memory 23, and any type of memory can be applied. For example, the second memory may be a dynamic RAM (DRAM), a ferroelectric random access memory (FeRAM), or an SRAM that does not use battery backup.

In this embodiment, the SRAM 22 is a slower, more expensive, physically larger, and smaller capacity memory than the DDR memory 23. However, the speed, price, size, and capacity of the SRAM 22 and the DDR memory 23 may be related in any manner, and are not limited to the example of this embodiment.

The controller 20 may include a plurality of memories including the first memory configured to hold data when the power supply is off and the second memory that does not hold data when the power supply is off, and may include three or more memories. For example, the controller 20 may include a plurality of first memories and a plurality of second memories. Further, for example, the controller 20 may include a memory other than the first memory and the second memory. As another example, the controller 20 may include a dedicated memory for storing firmware and a control program. The memory included in the processor 21 is also an example of the memory included in the controller 20.

The FPGA 24 is an integrated circuit having a configuration that can be set by the user at a later time. For example, the FPGA 24 may be configured to store detection results of a sensor connected to the controller 20 or the controlled device 30. Any type of sensor can be applied as the sensor. Examples of the sensor include a sensor for recognizing a workpiece to be processed, a sensor for detecting gripping of a workpiece, a torque sensor, a motor encoder, an acceleration sensor, a gyro sensor, a temperature sensor, and the like.

The controlled device 30 is an industrial machine controlled by the controller 20. Therefore, the term "controlled device 30" as used in this embodiment can be read as "industrial machine." The controlled device 30 is configured to execute, based on an instruction from the controller 20, a program stored in the controlled device 30 itself to execute a predetermined process. As the controlled device 30, any type of device can be applied. Examples of the controlled device 30 include an industrial robot, a robot controller, a motor controller, a machine tool, a pressing machine, a conveyance device, and the like. The controlled device 30 is also a type of industrial machine. The number of controlled devices 30 to be controlled by the controller 20 may be any number. For example, only one device or three or more devices may be controlled.

Programs and data described as being stored in each of the setting terminal 10, the controller 20, and the controlled device 30 may be supplied through the network. Moreover, the hardware configurations of the setting terminal 10, the controller 20, and the controlled device 30 are not limited to the above-mentioned examples, and various types of hardware can be applied. For example, a reader (for example, optical disc drive or memory card slot) configured to read a computer-readable information storage medium and an input/output device (for example, USB terminal) configured to directly connect to an external device may be included. In this case, programs and data stored in the information storage medium may be supplied through the reader or the input/output device. Further, for example, another component, for example, an application specific integrated circuit (ASIC), may be included.

2. Outline of Setting System

The user operates the setting terminal 10 to create a control program to be executed by the controller 20. The control program is a program for controlling the controlled device 30 in which instructions for the controlled device 30 are written. The control program can be created in any language, and for example, a ladder language or a robot language can be used. For example, the user uses a ladder chart, function blocks, or a source code editor to program the control program. For example, in every predetermined control cycle (scan), the controller 20 executes control calculation for the controlled device 30 or the like as defined by the control program (for example, ladder program) created by the user. In this embodiment, an attribute is set in a data unit before or after the control program is created.

The term "data unit" refers to the individual piece of data stored in any one of the SRAM 22 and the DDR memory 23. In other words, a data unit is the individual piece of data referred to or changed by a program, for example, the control program. The term "data unit" is sometimes also referred to as "variable data." For example, the data unit is designated by the user before creating the control program. Further, for example, an address of any memory is set in the data unit. The user can designate any data unit. Examples of data units that can be set include a data unit indicating the value of an intermediate calculation or the value of a calculation result by the control program, a data unit indicating a setting of teaching data, for example, of the controlled device 30, or a data unit indicating a detection result of the sensor. The data unit may also be a condition for starting or ending the control program.

The attribute is information for identifying whether or not the data unit is to be held when the power supply of the controller 20 is off. The attribute can also be referred to as a classification of the data unit. In this embodiment, there are two attributes, namely, a hold attribute indicating that the data unit is to be held when the power supply of the controller 20 is off, and a do-not-hold attribute indicating that the data unit is not to be held when the power supply of the controller 20 is off. Any one of the hold attribute and the do-not-hold attribute is set in the data unit. It is not required that an attribute be set for all data units, and there may be data units in which an attribute has not been set by the user.

In this embodiment, the user sets the initial attribute of the data unit when creating the control program. The user can change the initially-set attribute at a later time. A group of data units in which the hold attribute is set as the initial setting is referred to as an "M register," and a group of data units in which the do-not-hold attribute is set as the initial setting is referred to as a "G register." When the initial setting is performed, the data units of the M register are stored in the SRAM 22, and the data units of the G register are stored in the DDR memory 23.

A physical address of any one of the SRAM 22 and the DDR memory 23 is assigned to each data unit. The physical address may be designated by the user, or may be automatically assigned based on a predetermined address assignment rule. For example, a physical address of the SDRAM 22 is assigned to the data units of the M register such that the physical addresses are in series. Further, for example, a physical address of the DDR memory 23 is assigned to the data units of the G register such that the physical addresses are in series. An index register of each of the M register and the G register is stored in any memory included in the controller 20. A relative value from an address serving as a reference is stored in the index register.

For example, the user uses a setting tool installed in the setting terminal 10 to change the attribute of the initial setting. In this embodiment, as an example, there is described a case in which the attributes of the data units of the M register are changed, but as in a modification example of the present invention described later, the attributes of the data units of the G register may be changed. For example, when the setting tool is activated, an attribute designation screen for designating the attribute of the data unit is displayed on the monitor 15 of the setting terminal 10.

Figure 2:
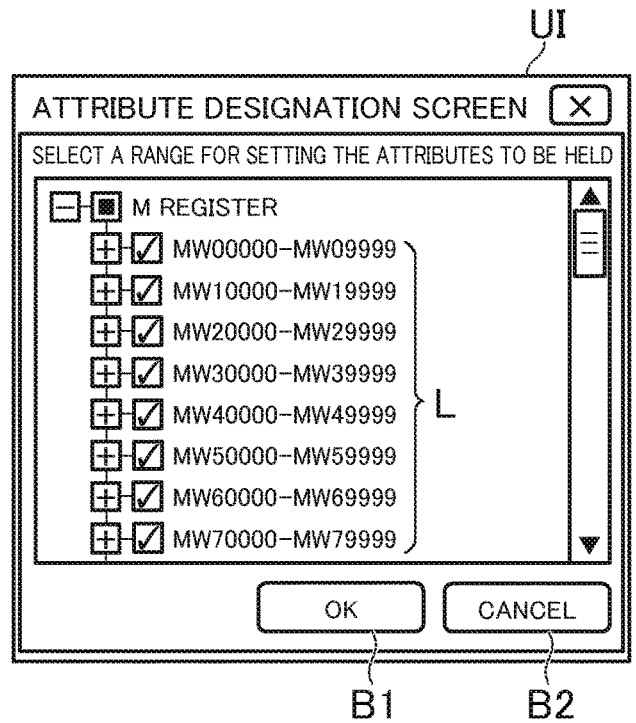
FIG. 2 is a diagram for illustrating an example of an attribute designation screen.
Figure 2:
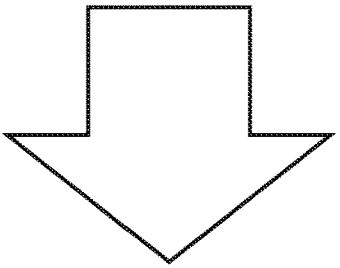
Figure 2:
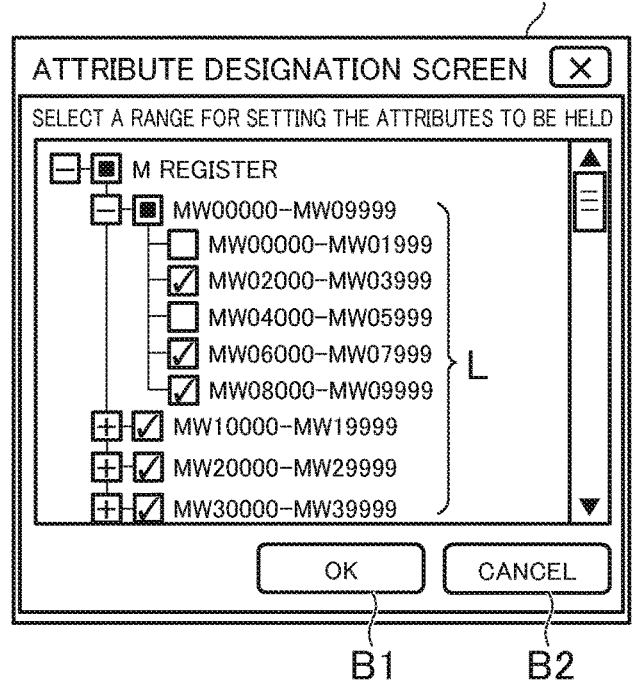

FIG. 2 is a diagram for illustrating an example of the attribute designation screen. As illustrated in FIG. 2, an attribute designation screen UI displays a list L of address bands of the M register. Each address band is a range of addresses having a certain width. In the list L, a numerical range is displayed as the name of the address bands. In this embodiment, the address bands are prepared in order to group the data units. In the example of FIG. 2, the data units are grouped in groups of 10,000 units, such as from "0" to "9999," "10000" to "19999," and so on. At least one data unit belongs to each address band.

For example, the attribute designation screen UI has a user interface (so-called TreeView control) for displaying hierarchical information. Next to each address band, a checkbox for opening and closing a tree of the data units belonging to the address band is displayed. The data units belonging to each address band can be switched between being displayed/not being displayed by performing an operation on the checkbox of the address band.

As illustrated in FIG. 2, when the user selects the checkbox of the address band from numbers "0" to "9999," the tree opens and the data units of the address band are displayed. In the example of FIG. 2, the data units using numbers "0" to "1999," the data units using numbers "2000" to "3999," the data units using numbers "4000" to "5999," the data units using numbers "6000" to "7999," and the data units using numbers "8000" to "9999" are displayed. The value of each of those addresses is the physical address at the time of the initial setting, but this value may be the value of a virtual address described later.

The checkbox is displayed next to the data units displayed in the list L. For example, the attribute can be changed by performing an operation on the checkbox of the data units. In this embodiment, the checkbox is checked when the hold attribute is to be set, and the checkbox is unchecked when the do-not-hold attribute is not to be set. For a data unit that has been set to the do-not-hold attribute by unchecking the checkbox, the user can return the setting to the hold attribute by again checking the checkbox. Similarly, for a data unit that has been set to the hold attribute by checking the checkbox, the user can return the setting to the do-not-hold attribute by again unchecking the checkbox.

At the time of the initial setting, the checkboxes of all of the data units of the M register are checked. The user unchecks the data units that he or she has subsequently determined not to be required for holding when the power supply is off. In the example of FIG. 2, the data units using numbers "0" to "1999" and the data units using numbers "4000" to "5999" are determined not to be required for holding, and those data units are unchecked.

The user can similarly set the attributes of the data units for the other address bands by opening the tree and performing an operation on the checkboxes. The user may also collectively set the hold attribute or the do-not-hold attribute in all of the data units of the address band by performing an operation on the checkbox of the address band without opening the tree. When the user selects an OK button B1, the attributes of the data units are confirmed and the addresses of the data units are automatically set. When the user selects a cancel button B2, the attributes are not changed.

For example, a data unit changed from the hold attribute to the do-not-hold attribute is required to be moved from the SRAM 22 to the DDR memory 23, and therefore the physical address of the SRAM 22 is changed to a physical address of the DDR memory 23. Further, for example, a data unit changed from the do-not-hold attribute to the hold attribute is required to be moved from the DDR memory 23 to the SRAM 22, and therefore the physical address of the DDR memory 23 is changed to a physical address of the SRAM 22.

For example, in the case of FIG. 2, the data units using numbers "0" to "1999" and the data units using numbers "4000" to "5999" are each changed from the hold attribute to the do-not-hold attribute, and therefore it is required to move a part of the M register from the SRAM 22 to the DDR memory 23. In this case, the data units of the M register are distributed in two physically different memories, and therefore the physical addresses of the M register are no longer in series. As a result, even when the index register is changed, it is not possible to access the data units of the M register, and hence the control program is required to be modified.

Therefore, in this embodiment, a virtual address is set for the data units of the M register such that the addresses are in series, and virtual addresses are stored in the index register. A conversion table of the virtual addresses and the physical addresses is recorded in the controller 20. The controller 20 refers to the conversion table, converts the virtual addresses into physical addresses, and accesses the SRAM 22 and the DDR memory 23 in which the data units of the M register are distributed.

Figure 3:
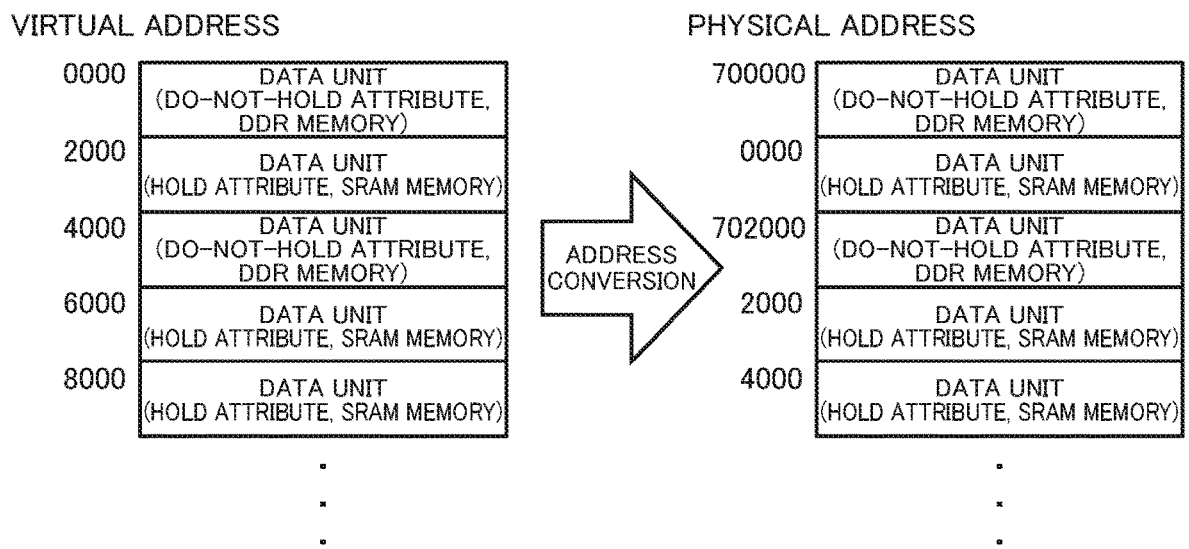
FIG. 3 is a diagram for illustrating how virtual addresses are converted into physical addresses.

FIG. 3 is a diagram for illustrating how virtual addresses are converted into physical addresses. As illustrated in FIG. 3, even when data units having the hold attribute and data units having the do-not-hold attribute are both included in the M register, the virtual addresses are set in series. Even when the actual physical addresses are not in series, due to the virtual addresses, the addresses appear to be (in the index register) in series. Therefore, even without modifying the control program, the data units of the M register distributed in the SRAM 22 and the DDR memory 23 can be accessed by changing the index register. Details of the setting system 1 are now described.

3. Functions to be Implemented in Setting System

Figure 4:
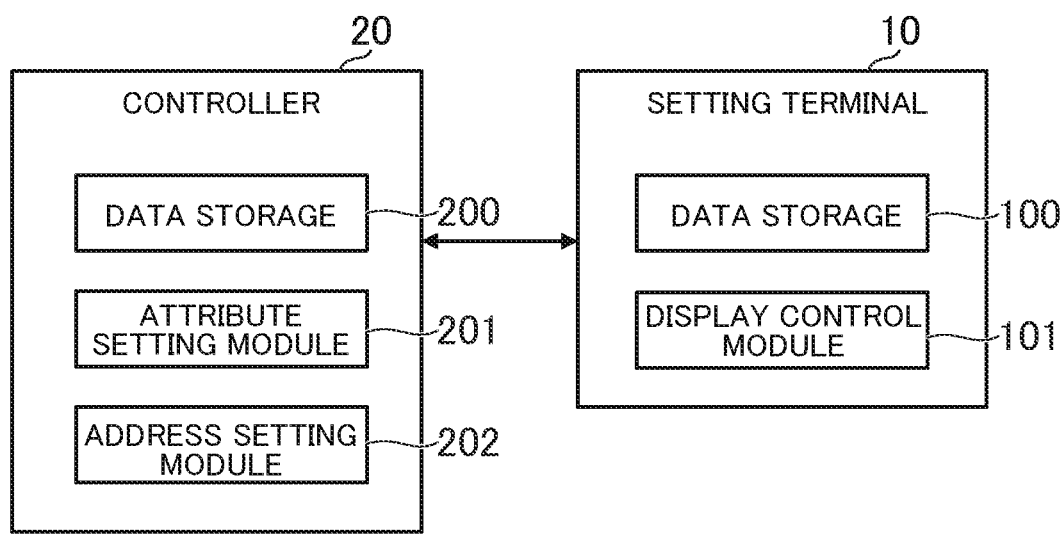
FIG. 4 is a functional block diagram for illustrating functions to be implemented in the setting system.

FIG. 4 is a functional block diagram for illustrating functions to be implemented in the setting system 1. As illustrated in FIG. 4, in the setting system 1, the setting terminal 10 implements a data storage 100 and a display control module 101, and the controller 20 implements a data storage 200, an attribute setting module 201, and an address setting module 202. The attribute setting module 201 and the address setting module 202 may also be implemented in the setting terminal 10, as in the modification example described later.

[3-1. Functions to be Implemented in Setting Terminal]

The data storage 100 is implemented mainly by the memory 12. The data storage 100 is configured to store data for executing the processing described in this embodiment. For example, the data storage 100 stores a setting tool. Further, for example, the data storage 100 may store attribute setting data, which is described later, acquired from the controller 20. In addition, for example, the data storage 100 may store image data of the attribute designation screen UI, the control program created by the user, a ladder chart file, a function block file, or a file in which a source code is written.

The display control module 101 is implemented mainly by the processor 11. The display control module 101 is configured to display the attribute designation screen UI for designating the attribute to be set in each data unit. The user operates the input device 14 to designate the attribute. The designation of the attribute is not limited to performing an operation on the checkbox, and any type of operation can be applied. For example, the attribute may be designated by an operation on another input form, for example, a radio button, or the attribute may be designated by inputting a character string or a numerical value indicating the attribute.

The attribute designation screen UI is not limited to the layout illustrated in FIG. 2, and may have any layout for receiving the attribute designation. For example, the attribute designation screen UI may have a tabular layout. Further, for example, the attribute designation screen UI may have a layout that receives the designation through another input form, for example, a radio button, in place of the checkbox. In addition, for example, the attribute designation screen UI is not required to group the data units into address bands.

For example, on the attribute designation screen UI, the data units are grouped into address bands. The width of the address bands may be a fixed value or a variable value. In the example of FIG. 2, the address band width is set to 10,000, but any other width can be applied. The width of the address bands displayed on the attribute designation screen UI may be different between the M register and the G register.

The term "grouping" refers to the fact that a plurality of data units belong to the same address band. On the attribute designation screen UI, data units belonging to the same address band are grouped by displaying those data units in association with each other. The grouping display mode is not limited to a tree like that illustrated in FIG. 2, and any mode capable of identifying the same group can be applied. For example, the names of the data units may be displayed in a space divided into each address band, or the names of the data units of the same address band may be displayed in the same color.

For example, when any one of the address bands is selected, the display control module 101 displays the attribute of each data unit belonging to the address band in a designatable manner. A plurality of address bands are displayed on the attribute designation screen UI, and the user can individually select any of those address bands. In the example of FIG. 2, there has been described a case in which the address bands are selected by using a checkbox, but the address bands may be selected by any other operation. For example, the address bands may be selected by using another input form, for example, a radio button.

For example, when an address band is not selected, the display control module 101 does not allow the attribute of each data unit of the address band to be designated. When an address band is selected, the display control module 101 allows the attribute of each data unit of the address band to be designated. As described with reference to FIG. 2, the display control module 101 may also control such that when an address band is not selected, a designation of the attribute of the entire address band is received.

[3-2. Functions to be Implemented in Controller]

The data storage 200 is implemented mainly by at least one of the memory included in the processor 21 and another memory. The data storage 200 is configured to store data for executing the processing described in this embodiment. For example, the data storage 200 stores a control program. Further, for example, the data storage 200 stores attribute setting data indicating the attribute set in the data unit.

FIG. 5 is a table for showing a data storage example of the attribute setting data. As shown in FIG. 5, the attribute setting data stores the name of the data unit, the attribute set in the data unit, and a conversion table. Other information may also be stored in the attribute setting data. For example, information indicating to which one of the M register and the G register the data unit belongs may be stored.

The name of the data unit is information for uniquely identifying the data unit. For example, the name of the data unit may be a character string designated by the user or the physical address at the time of the initial setting. In this embodiment, the name of the data unit is a character string including the physical address at the time of the initial setting and a numerical value that is in series with the numerical value of the other data units. The name of the data unit is not changed even when the virtual address or physical address is changed.

The conversion table is an example of conversion data. Therefore, the term "conversion table" as used in this embodiment can be read as "conversion data." The conversion data is information in which the virtual address and physical address of each data unit are associated with each other. The conversion data can be used to search for the physical address from the virtual address and to search for the virtual address from the physical address. In the conversion data, the virtual address and the physical address have a one-to-one correspondence. The conversion data is not limited to the table format, and any data format can be applied. For example, the conversion data may be in a CSV format or a text format. The conversion table is updated in accordance with a change in the attribute of the data unit. The updated conversion table is recorded in the controller 20. In the example of FIG. 5, only the start address of each data unit is shown.

For example, the data storage 200 may store the contents of the index register. At the time of the initial setting, all the data units of the M register have the hold attribute and the physical addresses of the SRAM 22 are set so as to be in series. Therefore, a relative value of the physical address of the SRAM 22 is stored in the index register as the address of the data units of the M register. Similarly, at the time of initial setting, all the data units of the G register have the do-not-hold attribute and the physical addresses of the DDR memory 23 are set so as to be in series. Therefore, a relative value of the physical address of the DDR memory 23 is stored in the index register as the address of the data units of the G register. When the attribute of the data unit is changed, the contents of the index register are changed by the address setting module 202 described later.

The attribute setting module 201 is implemented mainly by the processor 21. The attribute setting module 201 is configured to set, for each of the plurality of data units, the attribute indicating whether or not the data unit is to be held when the power supply is off. As used herein, "setting of the attribute" can also be referred to as determining, updating, or confirming the attribute. The attribute setting module 201 sets the attribute designated by the user in each data unit.

In this embodiment, the initial setting of the attribute is performed, and therefore the attribute setting module 201 changes the attribute of the data unit that the user instructed to be changed. The attribute setting module 201 updates the attribute setting data such that the changed attribute is associated with each data unit. Further, in this embodiment, the attribute designation screen UI is prepared, and therefore the attribute setting module 201 sets the attribute designated on the attribute designation screen UI in each data unit.

The attribute setting module 201 may set a hold attribute indicating that a data unit in which the physical address of the SRAM 22 has been set is to be held when the power supply is off, or may set a do-not-hold attribute indicating that a data unit in which the physical address of the DDR memory 23 has been set is not to be held when the power supply is off. The attribute setting module 201 may perform both of those settings or only one of those settings.

The address setting module 202 is implemented mainly by the processor 21. The address setting module 202 is configured to set the address of each data unit such that each data unit is stored in the memory corresponding to the attribute. The memory corresponding to the attribute is the SRAM 22 when the attribute is the hold attribute and is the DDR memory 23 when the attribute is the do-not-hold attribute. The relationship between the attribute and the memory is defined in the program of the setting tool. As used herein, "setting the address" refers to determining the address in which the data unit is to be stored. The term "address" as used herein refers to both virtual and physical addresses.

For example, the address setting module 202 sets, in each data unit, a physical address of the memory corresponding to the attribute. When all the data units of the M register are changed to the do-not-hold attribute, the address setting module 202 changes the physical address of all the data units of the M register from the SRAM 22 to the DDR memory 23. In this case, the address setting module 202 sets the physical address of each data unit of the M register such that the physical addresses of the DDR memory 23 are in series. The address setting module 202 also changes the index register in accordance therewith.

In this embodiment, virtual addresses are prepared, and therefore the address setting module 202 sets a virtual address and the physical address of the memory corresponding to the attribute in each data unit. The virtual addresses are addresses in a virtual address space different from the physical address space. The virtual addresses are addresses within a range determined in advance. A virtual address can also be said to be an address stored in the index register in place of a physical address.

The address setting module 202 sets a pair of a virtual address and a physical address in each data unit such that the addresses do not overlap with another data unit. The address setting module 202 creates a conversion table storing those pairs, and records the conversion table in the data storage 100. When the attribute of the data unit is changed, the address setting module 202 sets the virtual address and physical address corresponding to the changed attribute, and updates the conversion table.

The address setting module 202 records the conversion table of the virtual addresses and physical addresses of each data unit in the controller 20. For example, when the conversion table has been created, the address setting module 202 transmits the created conversion table to the controller 20 and records the created conversion table in the controller 20. Further, for example, when the conversion table has been updated, the address setting module 202 transmits the updated conversion table to the controller 20 and records the updated conversion table in the controller 20.

The controller 20 accesses each memory based on the conversion table recorded by the address setting module 202. For example, during execution of the control program, the controller 20 refers to the index register and identifies the virtual address of the data unit to be accessed. The controller 20 refers to the conversion table, converts the virtual address into a physical address, and accesses the memory area of the physical address. When it is required to transfer the virtual address of the data unit to the control program, the controller 20 is only required to refer to the conversion table and convert the accessed physical address into a virtual address.

In this embodiment, the address setting module 202 sets the virtual address of each data unit such that data units in which the hold attribute indicating that the data unit is to be held when the power supply is off is set and the data units in which the do-not-hold attribute indicating that the data unit is not to be held when the power supply is off is set are in series. For example, "in series" refers to a case in which the address next to the last address of the data unit in which the hold attribute is set becomes the first address of another data unit in which the do-not-hold attribute is set. As another example, "in series" refers to a case in which the address next to the last address of the data unit in which the do-not-hold attribute is set becomes the first address of another data unit in which the hold attribute is set.

For example, when the physical address of any one of a plurality of memories is set in advance in each data unit, the address setting module 202 sets the virtual address of each data unit such that the order of the physical addresses set in advance is maintained. In this embodiment, the physical addresses of the G register and the M register are determined in advance at the time of the initial setting, and therefore the address setting module 202 sets the virtual address of each data unit such that the order of those physical addresses is maintained. As a result, as shown in the data storage example of FIG. 5, sequential virtual addresses are set such that the order of the physical addresses of the G registers of the initial setting is maintained. That is, the address setting module 202 sets the virtual addresses such that an ascending order or a descending order of the physical addresses at the time of the initial setting is maintained.

The address setting module 202 changes the index register based on the address setting result. In this embodiment, the address setting module 202 sets the virtual addresses such that the virtual addresses are in series, and therefore the relative values of the virtual addresses in the index register are changed such that the sequential order is maintained.

4. Processing to be Executed in Setting System

Figure 6:
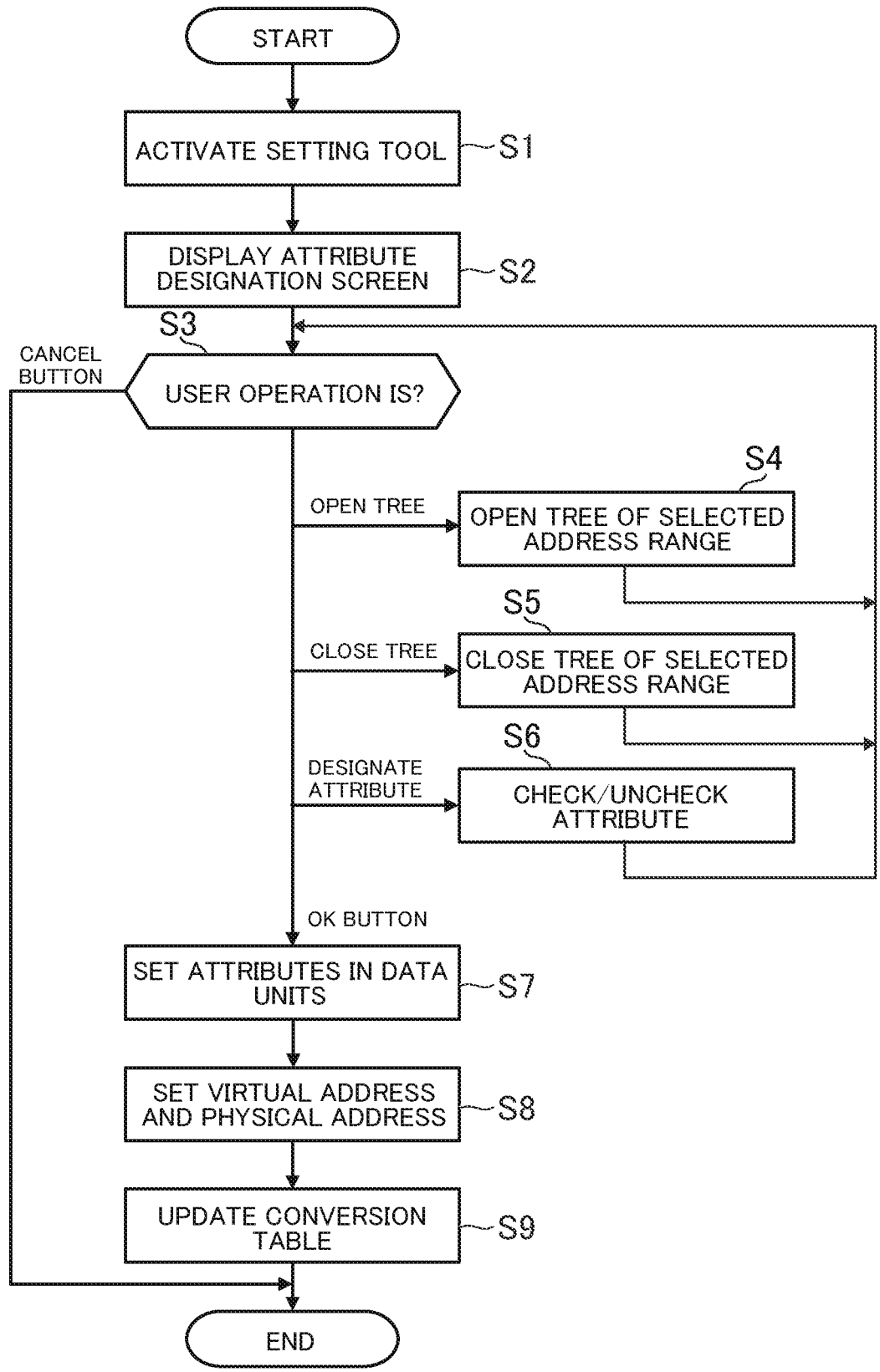
FIG. 6 is a flowchart for illustrating an example of processing to be executed in the setting system.

FIG. 6 is a flowchart for illustrating an example of processing to be executed in the setting system 1. The processing illustrated in FIG. 6 is executed by the processors 11 and 21 each operating in accordance with a program. The processing illustrated in FIG. 6 is an example of processing to be executed by the functional blocks illustrated in FIG. 4. When the processing illustrated in FIG. 6 is to be executed, it is assumed that the control program has been created in advance and that the initial setting of the attribute of each data unit (distribution between the M register and the G register) is complete.

As illustrated in FIG. 6, the setting terminal 10 activates the setting tool stored in the memory 12 (Step S1), and displays the attribute designation screen UI on the monitor 15 based on the attribute setting data acquired from the controller 20 (Step S2). When the attribute designation screen UI is displayed, no address band has yet been selected, and therefore the tree of each group is in a closed state (attribute designation screen UI in the upper part of FIG. 2).

The setting terminal 10 identifies a user operation based on a detection signal of the input device 14 (Step S3). In this embodiment, there is described a case in which the operation is any one of an operation of opening a tree, an operation of closing a tree, an operation of designating the attribute, an operation of selecting the OK button B1, or an operation of selecting the cancel button B2.

When an operation of opening a tree is performed (Step S3: Open tree), the setting terminal 10 opens the tree of the selected address band, and displays the names and checkboxes of the data units in the list L based on the attribute setting data (Step S4). In Step S4, for example, the attribute designation screen UI in the upper part of FIG. 2 is changed to the attribute designation screen UI in the lower part of FIG. 2, and the attributes of the data units of the address band for which the tree has been opened are displayed in a state in which the attributes can be individually designated.

When an operation of closing a tree is performed (Step S3: Close tree), the setting terminal 10 closes the tree of the selected address band, and deletes the names and checkboxes of the data units from the list L (Step S5). In Step S5, for example, the attribute designation screen UI in the lower part of FIG. 2 is changed to the attribute designation screen UI in the upper part of FIG. 2, and it is not possible to designate the attributes of the data units of the address band for which the tree has been closed.

When the attribute to be set in the data unit is designated (Step S3: Designate attribute), the setting terminal 10 checks or unchecks the designated attribute (Step S6). The attribute (whether the checkbox has been checked/unchecked) designated for each data unit is temporarily recorded in the memory 12. This attribute is confirmed when the OK button B1 is selected, and written in the controller 20.

When the OK button B1 is selected (Step S3: OK button), the setting terminal 10 transmits a predetermined setting instruction to the controller 20, and the controller 20 sets the attributes in the data units in accordance with the setting instruction (Step S7). The setting instruction is an instruction for setting the attribute and the addresses, and is performed by transmitting data in a predetermined format. For example, it is assumed that the setting instruction includes the attribute of each data unit designated from the attribute designation screen UI. In Step S7, the controller 20 updates the attribute setting data so as to have the attribute (attribute designated by the user) of each data unit included in the setting instruction.

The controller 20 sets a virtual address and the physical address of the memory corresponding to the attribute in each data unit (Step S8). In Step S8, the controller 20 sets, in the data units of the M register, the virtual addresses so as to be in series and the physical addresses of the memory corresponding to the attribute. The controller 20 updates the conversion table so as to have the setting of Step S8 (Step S9), and this processing ends. Meanwhile, when the cancel button B2 is selected in Step S3 (Step S3: Cancel button), this processing ends. In this case, the processing of Step S7 to Step S9 is not executed, and the attribute setting data is not updated.

In the embodiment described above, in each data unit, an attribute indicating whether or not the data unit is to be held when the power supply is off is set, and the address of each data unit is set such that each data unit is stored in the memory corresponding to the attribute. This enables the memory storing the data unit to be switched without modifying the control program, to thereby enable the time and effort involved in modifying the control program to be eliminated. For example, when the user changes the attribute of the data unit, the data unit is stored in the memory corresponding to the attribute, and therefore it is not required to modify or change the ladder chart or source code, and the time and effort involved in modifying the control program can be eliminated. Further, when a data unit of the M register is to be moved to the G register, the access speed can be increased and the usage amount of the M register can be reduced. That is, the high-speed memory and the low-speed memory can be switched. Moreover, for example, when the controller 20 executes the control calculation every predetermined control cycle, the response performance is better when the control cycle is shorter, but it becomes impossible to set a short control cycle when the processing content per one calculation cycle is increased (that is, the control cycle becomes long). In the related art, it has been required to change the control program in consideration of the response speed of the memory, but with the controller 20 described in the embodiment, it is possible to prevent a scan time from being increased by reallocating to a faster memory even when the processing content is increased.

Further, through setting a virtual address and the physical address of the memory corresponding to the attribute in each data unit, and accessing each memory by the industrial machine based on conversion data, for example, it is possible to switch the memory storing the data unit by changing the index register even without modifying the control program, and to thereby eliminate the time and effort involved in modifying the program. That is, the SRAM 22 and the DDR memory 23 can both be accessed by changing the index register. Moreover, the user is not required to associate the virtual address with the physical address or to set conversion data, and the burden on the user can be reduced. In addition, the controller 20 can reliably access the physical address of each data unit based on the conversion data.

Further, through setting the virtual address of each data unit such that the data units set to an attribute indicating that the data unit is to be held when the power supply is off and the data units set to an attribute indicating that the data unit is not to be held when the power supply is off are in series, for example, it is sufficient to just change the index register, and it is possible to eliminate the time and effort involved in modifying the control program.

Further, through setting the virtual address of each data unit such that the order of the physical addresses set in advance is maintained, as seen from the user, the address order of the data units does not change, and therefore it is easier to manage the addresses of the data units.

Further, when the do-not-hold attribute is set in data units in which the physical address of the SRAM 22 is set, the data units that are not required to be held can be stored in the DDR memory 23, and the SRAM 22 can be effectively used. When the hold attribute is set in data units in which the physical address of the DDR memory 23 is set, the data units that are required to be held can be stored in the SRAM 22 and the data units can be reliably held.

Further, through displaying the attribute designation screen UI for designating the attribute to be set in each data unit and setting the attribute designated on the attribute designation screen UI in each data unit, the efficiency of the attribute setting work by the user can be improved.

Further, on the attribute designation screen UI, through grouping the data units into address bands and displaying the attribute of each data unit belonging to the selected address band in a designatable manner, the efficiency of the attribute setting work by the user can be improved.

Further, it is possible to eliminate the time and effort involved in modifying the control program in the controller 20 including a plurality of memories including a non-volatile memory or a memory supporting battery backup and a volatile memory or a memory without supporting battery backup.

5. Modification Examples

The present invention is not limited to the embodiment described above, and can be modified suitably without departing from the spirit of the present invention.

Figure 7:
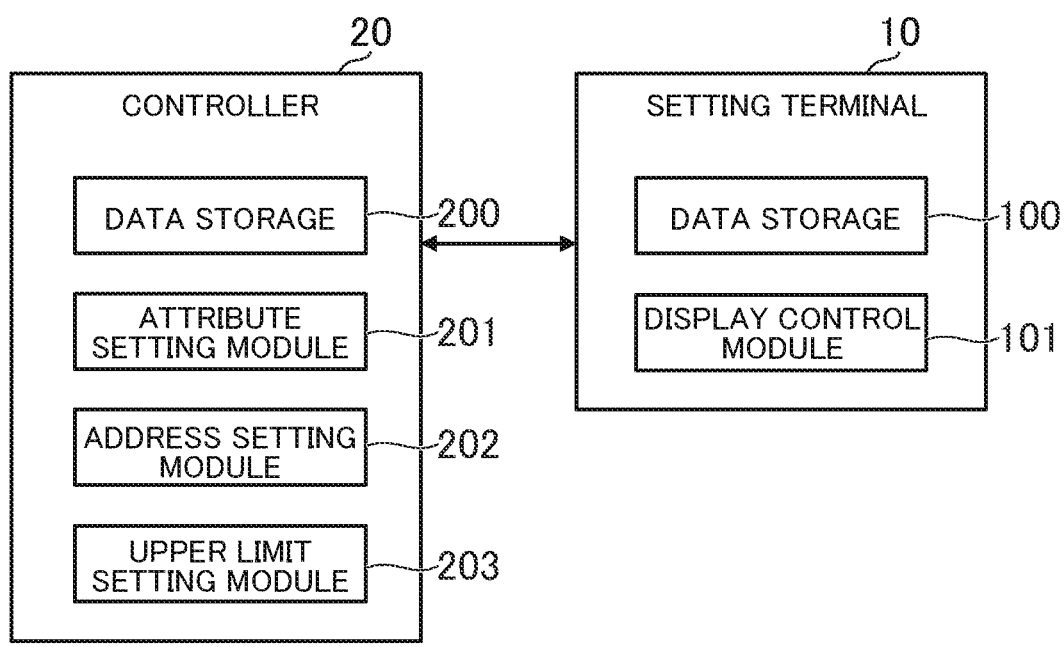
FIG. 7 is a functional block diagram of a modification example of the present invention.

(1) For example, when the attributes of the data units are overly biased, the memory capacity may be insufficient, and therefore an upper limit may be set for the data units in which the attribute can be set. FIG. 7 is a functional block diagram of a modification example of the present invention. As illustrated in FIG. 7, in the modification example, an upper limit setting module 203 is implemented in addition to the functions described in the embodiment. The upper limit setting module 203 is implemented mainly by the processor 21.

The upper limit setting module 203 is configured to set an upper limit for the data units capable of setting at least one of the hold attribute indicating that the data unit is to be held when the power supply is off and the do-not-hold attribute indicating that the data unit is not to be held when the power supply is off. The upper limit setting module 203 may set an upper limit for both the hold attribute and the do-not-hold attribute, or may set an upper limit for only one of those attributes.

As used herein, the term "upper limit" refers to the total number of data units in which the attribute can be set, or an upper limit value of the total amount of the data units. The upper limit of the hold attribute is set in accordance with the capacity of the SRAM 22, and the upper limit of the do-not-hold attribute is set in accordance with the capacity of the DDR memory 23. The upper limit is set so as not to exceed those capacities. The upper limit may be a fixed value or a variable value.

The upper limit setting module 203 determines whether or not the upper limit of the attribute has been reached based on the attribute setting data. When the attribute has reached the upper limit, the upper limit setting module 203 restricts the setting of more of the attribute. Therefore, for the attribute that has reached the upper limit, the attribute is not set in any further data units (that is, the attribute setting data is not updated). When the attribute has not reached the upper limit, the upper limit setting module 203 allows the attribute to be set without restriction.

According to Modification Example (1), when an upper limit is set for the data units capable of setting the hold attribute, the SRAM 22 can be prevented from running out of capacity, and when an upper limit is set for the data units capable of setting the do-not-hold attribute, the DDR memory 23 can be prevented from running out of capacity.

Figure 8:
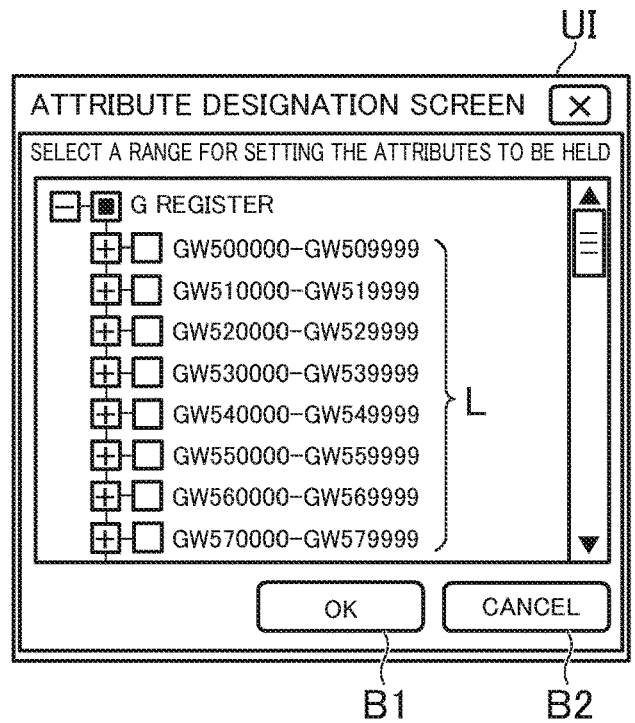
FIG. 8 is a diagram for illustrating how attributes of data units of a G register are changed.
Figure 8:
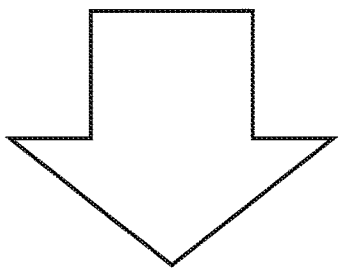
Figure 8:
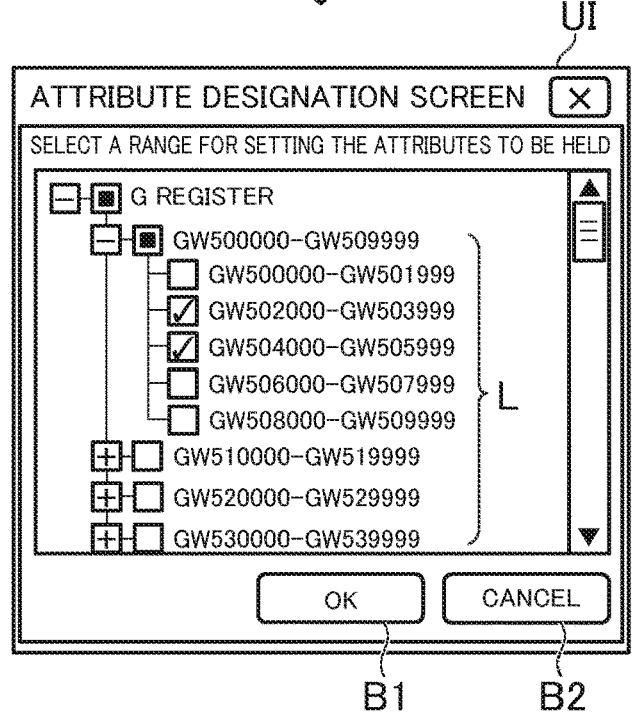

(2) Further, for example, in the embodiment, there is described a case in which the attributes of the data units of the M register are changed, but the attributes of the data units of the G register may be changed. FIG. 8 is a diagram for illustrating how the attributes of the data units of the G register are changed. As illustrated in FIG. 8, the attributes may be changed from the attribute designation screen UI for the G register as well. The data units of the G register are not checked at the time of the initial setting.

The user checks the data units determined as being required to be held when the power supply is off. In the example of FIG. 8, the user determines that it is required to hold the data units using the numbers from "502000" to "503999" and the data units using the numbers from "504000" to "505999," and checks those data units.

The address setting module 202 sets the virtual address and the physical address of the SRAM 22 such that those data units are stored in the SRAM 22. Similarly to the M register, the virtual addresses of the G register are also in series so as to maintain the initial setting order.

(3) Further, for example, in the embodiment, there is described a case in which the attribute setting module 201 and the address setting module 202 are implemented in the controller 20, but those functions may be implemented in the setting terminal 10. In this case, the attribute setting module 201 and the address setting module 202 are each implemented mainly by the processor 11. For example, the attribute setting module 201 sets an attribute in each data unit, and writes the set attribute in the attribute setting data of the controller 20. Moreover, for example, the address setting module 202 sets the address of each data unit, and updates the conversion table of the controller 20 based on the set address. The details of the attribute setting processing and the address setting processing are as described in the embodiment.

(4) Further, for example, the modification examples described above may be combined.

Further, for example, when all the data units of the G register are set to the do-not-hold attribute or when all the data units of the M register are set to the hold attribute, the physical addresses can be in series without distributing the data units between the memories, and therefore the virtual address may be omitted. Moreover, for example, the initial setting of the G register and the M register may be omitted. In this case, the user may designate the attributes in the data units when creating the control program. The address setting module 202 sets the virtual address of each data unit so as to be in series with the other data units, and sets the physical address of the memory corresponding to the attribute. When the user subsequently changes the attribute from the attribute designation screen UI, the virtual address and the physical address set when the control program is created are changed. The index register may be changed in accordance with the change to those addresses. In addition, for example, the controller 20 is not required to perform cyclic control.

Further, for example, the functions described as being implemented in the setting terminal 10 may be implemented in the controller 20. Moreover, for example, the functions described as being implemented in the controller 20 may be implemented in the setting terminal 10. In addition, for example, there has been described a case in which the main functions are implemented in the setting terminal 10, but each function may be shared by a plurality of computers. For example, each function may be shared by the setting terminal 10 and the controller 20. Further, for example, each function may be implemented by another computer, for example, a server computer, or may be shared by the setting terminal 10 and the another computer.

Further, the embodiment described above is given as a specific example, and is not to limit the invention disclosed in the present application to the very configuration and data storage examples of the specific example. A person skilled in the art may make various modifications to the disclosed embodiment with regard to, for example, the shapes and numbers of physical components, data structures, and execution orders of processing. It is to be understood that the technical scope of the invention disclosed in the present application encompasses such modifications. In other words, it should be understood by those skilled in the art that various modifications, combinations, sub-combinations and alterations may occur depending on design requirements and other factors insofar as they are within the scope of the appended claims or equivalents thereof.

What is claimed is:

1. A setting system comprising:
   a motor controller configured to control a motor and store variable data units, and
   a setting terminal configured to display a user interface that receives a designation of an attribute of each of the variable data units from a user,
      wherein each of the variable data units are referred to or changed by a motor control program that is executed by the motor controller,
      wherein the user operates the setting terminal to create the motor control program;
      wherein the attribute indicates whether the variable data unit is to be held when the power supply is off,
      wherein the motor controller comprises:
      a plurality of memories including a first memory configured to hold data when a power supply is off and a volatile second memory;
      circuitry configured to:
         set, in each of the variable data units, the attribute based on the designation in the user interface of the setting terminal;
         set an address of each variable data unit such that each variable data unit is stored in one of the plurality of memories corresponding to the attribute;
         set, in each variable data unit, a virtual address and a physical address of one of the plurality of memories corresponding to the attribute,
         record conversion data of the virtual address and the physical address of each variable data unit,
         set the virtual address of each variable data unit such that the variable data units in which the set attribute indicates that the variable data unit is to be held when the power supply is off and the variable data units in which the set attribute indicates that the variable data unit is inhibited from being held when the power supply is off, are in series.

2. The setting system according to claim 1, wherein the circuitry is configured to set the virtual address of each variable data unit in series such that the virtual address next to the last address of the variable data unit in which either the hold attribute is set or the last address of a variable data unit in which the do-not-hold attribute is set becomes the first of the other of the variable data unit in which hold attribute is set or the first variable data unit in which the do-not-hold attribute is set.

3. The setting system according to claim 2,
   wherein a physical address of any one of the plurality of memories is set in advance in each variable data unit, and
   wherein the circuitry is configured to set, in the variable data units in which the physical address of the first memory is set, an attribute indicating that the variable data unit is inhibited from being held when the power supply is off, or set, in the variable data units in which the physical address of the second memory is set, an attribute indicating that the variable data unit is to be held when the power supply is off.

4. The setting system according to claim 2, wherein the circuitry is configured to set, in each variable data unit, the attribute designated on an attribute designation screen for designating the attribute to be set in each variable data unit.

5. The setting system according to claim 1, wherein the circuitry is configured to set the virtual address of each variable data unit in series such that the virtual addresses oscillate between variable data units in which the set attribute indicates that the variable data unit is to be held when the power supply is off and variable data units in which the set attribute indicates that the variable data unit is inhibited from being held when the power supply is off.

6. The setting system according to claim 5,
wherein the physical address of any one of the plurality of memories is set in advance in each variable data unit, and
wherein the circuitry is configured to set the virtual address of each variable data unit such that an order of the physical addresses set in advance is maintained.

7. The setting system according to claim 5,
wherein a physical address of any one of the plurality of memories is set in advance in each variable data unit, and
wherein the circuitry is configured to set, in the variable data units in which the physical address of the first memory is set, an attribute indicating that the variable data unit is inhibited from being held when the power supply is off, or set, in the variable data units in which the physical address of the second memory is set, an attribute indicating that the variable data unit is to be held when the power supply is off.

8. The setting system according to claim 5, wherein the circuitry is configured to set, in each variable data unit, the attribute designated on an attribute designation screen for designating the attribute to be set in each variable data unit.

9. The setting system according to claim 1,
wherein the physical address of any one of the plurality of memories is set in advance in each variable data unit, and
wherein the circuitry is configured to set the virtual address of each variable data unit such that an order of the physical addresses set in advance is maintained in the virtual addresses.

10. The setting system according to claim 9,
wherein a physical address of any one of the plurality of memories is set in advance in each variable data unit, and
wherein the circuitry is configured to set, in the variable data units in which the physical address of the first memory is set, an attribute indicating that the variable data unit is inhibited from being held when the power supply is off, or set, in the variable data units in which the physical address of the second memory is set, an attribute indicating that the variable data unit is to be held when the power supply is off.

11. The setting system according to claim 9, wherein the circuitry is configured to set, in each variable data unit, the attribute designated on an attribute designation screen for designating the attribute to be set in each variable data unit.

12. The setting system according to claim 1,
wherein a physical address of any one of the plurality of memories is set in advance in each variable data unit, and
wherein the circuitry is configured to set, in the variable data units in which the physical address of the first memory is set, an attribute indicating that the variable data unit is inhibited from being held when the power supply is off, or set, in the variable data units in which the physical address of the second memory is set, an attribute indicating that the variable data unit is to be held when the power supply is off.

13. The setting system according to claim 1, wherein the circuitry is configured to set, in each variable data unit, the attribute designated on an attribute designation screen for designating the attribute to be set in each variable data unit.

14. The setting system according to claim 13, wherein the variable data units are grouped into address bands on the attribute designation screen, and when any one of the address bands is selected, the attribute of each variable data unit belonging to the one of the selected address bands becomes designatable.

15. The setting system according to claim 1, wherein the circuitry is configured to set an upper limit in variable data units in which at least one of the attribute indicating that the variable data unit is to be held when the power supply is off and the attribute indicating that the variable data unit is inhibited from being held when the power supply is off, is settable.

16. The setting system according to claim 1,
wherein the first memory includes a non-volatile memory or a memory supporting battery backup, and
wherein the second memory includes a memory without supporting battery backup.

17. The setting system according to claim 1, wherein the motor controller is a Programmable Logic Controller.

18. A setting system for a motor controller comprising:
the motor controller configured to control a motor and store variable data units,
a setting terminal configured to display a user interface that receives a designation of an attribute of each of the variable data units from a user,
wherein each of the variable data units are referred to or changed by a motor control program that is executed by the motor controller,
wherein the user operates the setting terminal to create the motor control program;
wherein the attribute indicates whether the variable data unit is to be held when the power supply is off,
the motor controller including a plurality of memories including a first memory configured to hold data when a power supply is off and a volatile second memory,
the setting system comprising circuitry configured to:
set, in each of the variable data units, the attribute based on the designation in the user interface of the setting terminal;
set an address of each variable data unit such that each variable data unit is stored in one of the plurality of memories corresponding to the attribute.

19. A setting method for a motor controller configured to control a motor and store variable data units, and a setting terminal configured to display a user interface, the motor controller including a plurality of memories including a first memory configured to hold data when a power supply is off and a volatile second memory, the setting method comprising:
receiving a designation of an attribute of each of the variable data units from a user on the user interface of the setting terminal,
wherein each of the variable data units are referred to or changed by a motor control program that is executed by the motor controller,
wherein the user operates the setting terminal to create the motor control program;
wherein the attribute indicates whether the variable data unit is to be held when the power supply is off, setting, in each of a plurality of the variable data units, the attribute based on the designation in the user interface of the setting terminal;

setting an address of each variable data unit such that each variable data unit is stored in one of the plurality of memories corresponding to the attribute;

setting, in each variable data unit, a virtual address and a physical address of one of the plurality of memories corresponding to the attribute, recording conversion data of the virtual address and the physical address of each variable data unit, and setting the virtual address of each variable data unit such that the variable data units in which the set attribute indicates that the variable data unit is to be held when the power supply is off and the variable data units in which the set attribute indicates that the variable data unit is inhibited from being held when the power supply is off, are in series.

20. A non-transitory computer readable information storage medium storing a program for causing a motor controller configured to control a motor and store variable data units, or for causing a setting terminal for the motor controller, the motor controller including a plurality of memories including a first memory configured to hold data when a power supply is off and a volatile second memory, to:

display, in the setting terminal, a user interface that receives a designation of an attribute of each of the variable data units from a user, wherein each of the variable data units are referred to or changed by a motor control program that is executed by the motor controller, wherein the user operates the setting terminal to create the motor control program;

wherein the attribute indicates whether the variable data unit is to be held when the power supply is off, set, in each of the variable data units, the attribute based on the designation in the user interface of the setting terminal;

set an address of each variable data unit such that each variable data unit is stored in one of the plurality of memories corresponding to the attribute;

set, in each variable data unit, a virtual address and a physical address of one of the plurality of memories corresponding to the attribute, record conversion data of the virtual address and the physical address of each variable data unit, and set the virtual address of each variable data unit such that the variable data units in which the set attribute indicates that the variable data unit is to be held when the power supply is off and the variable data units in which the set attribute indicates that the variable data unit is inhibited from being held when the power supply is off, are in series.

* * * * *